(12) United States Patent
Kitani

(10) Patent No.: US 11,255,354 B2
(45) Date of Patent: Feb. 22, 2022

(54) CONTROL VALVE

(71) Applicant: KYB Corporation, Tokyo (JP)

(72) Inventor: Toshiyuki Kitani, Nagano (JP)

(73) Assignee: KYB CORPORATION, Tokyo (JP)

(*) Notice: Subject to any disclaimer, the term of this patent is extended or adjusted under 35 U.S.C. 154(b) by 55 days.

(21) Appl. No.: 16/758,198

(22) PCT Filed: Mar. 1, 2019

(86) PCT No.: PCT/JP2019/008149
§ 371 (c)(1),
(2) Date: Apr. 22, 2020

(87) PCT Pub. No.: WO2019/172131
PCT Pub. Date: Sep. 12, 2019

(65) Prior Publication Data
US 2020/0318747 A1 Oct. 8, 2020

(30) Foreign Application Priority Data

Mar. 9, 2018 (JP) .............................. JP2018-043142
Mar. 9, 2018 (JP) .............................. JP2018-043143

(51) Int. Cl.
*F15B 13/04* (2006.01)
*F16K 11/07* (2006.01)
*F15B 11/08* (2006.01)

(52) U.S. Cl.
CPC .......... *F15B 13/0403* (2013.01); *F15B 11/08* (2013.01); *F16K 11/0712* (2013.01);
(Continued)

(58) Field of Classification Search
CPC .............. F15B 13/0417; F15B 13/0418; F15B 13/0403; F16K 11/0716
See application file for complete search history.

(56) References Cited

U.S. PATENT DOCUMENTS 3,106,065 A * 10/1963 Stacey ................ F16K 11/0704
91/421
3,502,109 A * 3/1970 Straight .................. F16K 11/07
137/625.64
(Continued)

FOREIGN PATENT DOCUMENTS

WO        2012/124386 A1     9/2012

*Primary Examiner* — F Daniel Lopez
*Assistant Examiner* — Michael Quandt
(74) *Attorney, Agent, or Firm* — Rabin & Berdo, P.C.

(57) ABSTRACT

A control valve has a first and second pilot chambers facing both ends of a spool, a signal pressure passage configured to lead a pilot pressure of the first and second pilot chambers to another device other than the control valve as a signal pressure, a communication groove configured to allow the first pilot chamber and the signal pressure passage to communicate with each other, a communication hole configured to allow the second pilot chamber and the signal pressure passage to communicate with each other, and a check valve interposed in the communication hole, and the check valve has a poppet portion configured to open or close the communication hole and a spacer portion configured to regulate a moving amount of the poppet portion in an open direction, and the control valve further includes a movement regulating portion configured to regulate movement of the spacer portion toward the poppet portion.

5 Claims, 9 Drawing Sheets

(52) U.S. Cl.
CPC . *F16K 11/0716* (2013.01); *F15B 2211/30525* (2013.01); *F15B 2211/329* (2013.01); *F15B 2211/355* (2013.01); *F15B 2211/6355* (2013.01)

(56) References Cited

U.S. PATENT DOCUMENTS

| | | | | |
|---|---|---|---|---|
| 4,037,410 | A * | 7/1977 | Jackson | F15B 13/0403 60/445 |
| 6,868,672 | B2 * | 3/2005 | Luo | E02F 9/2207 60/468 |
| 7,921,878 | B2 * | 4/2011 | Coolidge | F15B 13/0417 137/625.68 |
| 8,844,899 | B2 * | 9/2014 | Fujiwara | F15B 13/042 251/18 |
| 8,851,119 | B2 * | 10/2014 | Fujiwara | F16K 3/26 137/625.69 |
| 9,810,243 | B2 * | 11/2017 | Terao | E02F 9/2217 |
| 2013/0037131 | A1 | 2/2013 | Fujiwara et al. | |

* cited by examiner

CONTROL VALVE

TECHNICAL FIELD

The present invention relates to a control valve.

BACKGROUND ART

A control valve configured to be switched by an action of a pilot pressure and to lead the pilot pressure to another device is known (see WO2012/124386A1). This control valve includes a spool slidably incorporated in a valve housing and a first pilot chamber and a second pilot chamber disposed by facing both ends of the spool, and the spool is moved by an action of a pilot pressure led to either one of the first pilot chamber and the second pilot chamber.

A signal pressure passage configured to lead the pilot pressure of the first pilot chamber or the second pilot chamber as a signal pressure of the other device is formed in the valve housing. A communication groove configured to allow the first pilot chamber and the signal pressure passage to communicate with each other when the pilot pressure is led to the first pilot chamber and the spool is moved and a communication hole configured to allow the second pilot chamber and the signal pressure passage to communicate with each other when the pilot pressure is led to the second pilot chamber and the spool is moved, are formed in the spool. A check valve configured to allow only flow from the second pilot chamber to the signal pressure passage is interposed in the communication hole.

A centering spring configured to apply a spring force to one end portion of the spool is accommodated in the first pilot chamber. A base end portion of a rod extending in the first pilot chamber is screwed and fastened to an opening on the one end portion of the spool. A pair of spring receiving members slidable along an outer periphery of the rod is accommodated in the first pilot chamber, and the centering spring is interposed between the pair of spring receiving members.

SUMMARY OF INVENTION

The check valve described in WO2012/124386A1 can be constituted by a poppet portion configured to move in an axial direction and to open/close the communication hole and a spacer portion configured to regulate a moving amount of the poppet portion in the axial direction. In such configuration, when the pilot pressure is led to the second pilot chamber, the poppet portion is moved until it abuts to the spacer portion, and an open valve state is brought about. On the other hand, when the pilot pressure is led to the first pilot chamber, the poppet portion is seated on a seat portion of the communication hole, and a closed valve state is brought about.

However, in the check valve described in WO2012/124386A1, since the base end portion of the rod is screwed and fastened to the one end portion of the spool, when the pilot pressure is led to the first pilot chamber, there is a concern that a working oil enters into the check valve side from the first pilot chamber through a connection portion (screwed/fastened portion) between the one end portion of the spool and the rod. If the working oil enters into the check valve side, a pressure in a space between a rear surface (a surface on a side opposite to the surface in contact with the poppet portion) of the spacer portion and an end surface of the base end portion of the rod rises.

As a result, the spacer portion moves in the axial direction and presses the poppet portion so as to press the poppet portion onto the seat portion. After that, when the first pilot chamber is connected to a tank, the pressure in the space between the rear surface of the spacer portion and the end surface of the base end portion of the rod goes out to the tank through the connection portion (screwed/fastened portion) between the one end portion of the spool and the rod. However, since it takes time for the pressure in the space between the rear surface of the spacer portion and the end surface of the base end portion to lower to a tank pressure, the pressure remains in the space on the rear surface side of the spacer portion. If the pressure remains in the space on the rear surface side of the spacer portion when the pilot chamber is led to the second pilot chamber, a valve opening operation of the check valve according to the pressure in the second pilot chamber is inhibited, and responsiveness of the check valve is deteriorated, which is a problem.

The present invention has an object to improve responsiveness of a check valve.

According to an aspect of the present invention, a control valve, including: a spool slidably incorporated in a valve housing; a first pilot chamber and a second pilot chamber disposed by facing both ends of the spool; a signal pressure passage formed in the valve housing and configured to lead a pilot pressure of the first pilot chamber or the second pilot chamber to another device other than the control valve as a signal pressure; a communication groove formed in the spool and configured to allow the first pilot chamber and the signal pressure passage to communicate with each other when the spool is at a neutral position; a communication hole formed in the spool and configured to allow the second pilot chamber and the signal pressure passage to communicate with each other; and a check valve interposed in the communication hole and configured to allow only the flow from the second pilot chamber to the signal pressure passage, wherein the communication groove allows the first pilot chamber and the signal pressure passage to communicate with each other when the pilot pressure is led to the first pilot chamber and the spool is moved, while the communication between the first pilot chamber and the signal pressure passage is shut off when the pilot pressure is led to the second pilot chamber and the spool is moved; the check valve comprises: a poppet portion configured to open or close the communication hole; and a spacer portion configured to regulate a movement amount of the poppet portion to an open direction; and the control valve further comprises a movement regulating portion configured to regulate movement of the spacer portion toward the poppet portion.

DESCRIPTION OF EMBODIMENTS

First Embodiment

A control valve 100 according to a first embodiment of the present invention will be described by referring to FIGS. 1 to 5, 6A, and 6B.

The control valve 100 switches supply/discharge of a working fluid with respect to an actuator and controls an operation of the actuator. An example in which a working oil is used as the working fluid will be described, but other fluids such as a working water and the like may be used as the working fluid.

Figure 1:
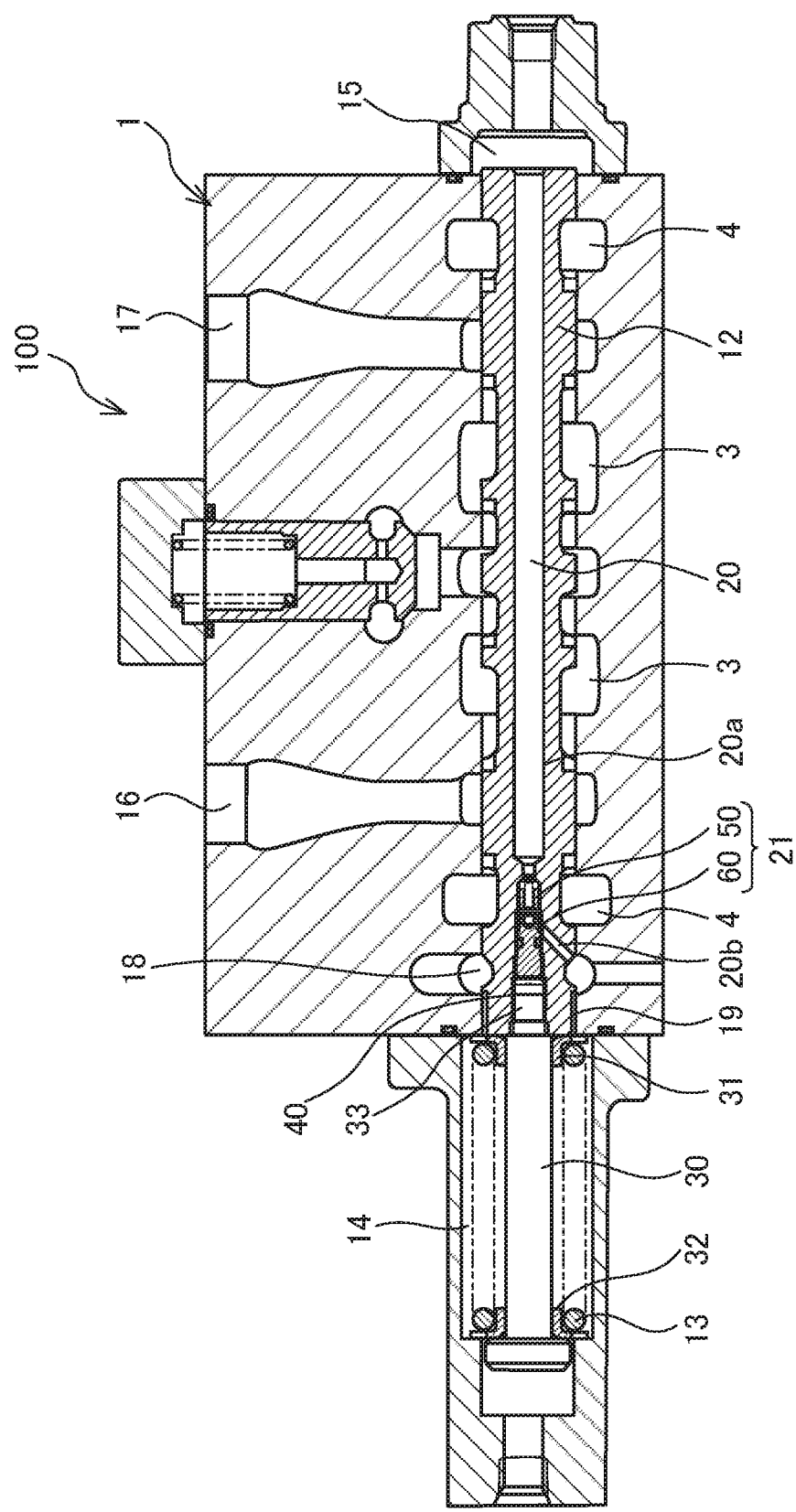
FIG. 1 is a sectional view illustrating a control valve according to a first embodiment of the present invention.

FIG. 1 is a sectional view illustrating the control valve 100. As illustrated in FIG. 1, the control valve 100 includes a valve housing 1, a spool 12 slidably incorporated in the valve housing 1, a first pilot chamber 14 and a second pilot chamber 15 respectively disposed by facing each of both ends of the spool 12, and a centering spring 13 as a biasing member accommodated in the first pilot chamber 14 and configured to apply a spring force to one end portion of the spool 12.

A rod 30 extending in the first pilot chamber 14 is connected to the one end portion of the spool 12. A pair of spring receiving members 31 and 32 slidable along an outer periphery of the rod 30 is accommodated in the first pilot chamber 14, and the centering spring 13 is interposed between the pair of spring receiving members 31 and 32.

A pair of actuator ports 16 and 17 communicating with the actuator is formed in the valve housing 1.

When a pilot pressure acts on neither the first pilot chamber 14 nor the second pilot chamber 15, the first pilot chamber 14 and the second pilot chamber 15 communicate with a tank maintained at an atmospheric pressure. As a result, the spool 12 is held at a neutral position by the biasing force of the centering spring 13. In this state, supply/discharge of the working oil to/from the actuator through the actuator ports 16 and 17 is shut off, and the actuator is held in a stopped state.

When the pilot pressure is led to either one of the first pilot chamber 14 and the second pilot chamber 15 by a lever operation by a worker, the spool 12 is moved against the spring force of the centering spring 13 by an action of the pilot pressure, and the actuator is operated. At this time, the other of the first pilot chamber 14 and the second pilot chamber 15 communicates with the tank.

More specifically, when the pilot pressure is led to the first pilot chamber 14, and the second pilot chamber 15 communicates with the tank, the spool 12 is moved to the right direction in FIG. 1 against the spring force of the centering spring 13. When the spool 12 is moved to the right direction in FIG. 1, the actuator port 17 communicates with a pump as a hydraulic pressure supply source through a pump port 3, and the actuator port 16 communicates with the tank through a tank port 4. As a result, the working oil discharged from a pump is supplied to the actuator through the actuator port 17, the working oil is discharged from the actuator to the tank through the actuator port 16, and the actuator is operated in one direction.

When the pilot pressure is led to the second pilot chamber 15, and the first pilot chamber 14 communicates with the tank, the spool 12 is moved to the left direction in FIG. 1 against the spring force of the centering spring 13. When the spool 12 is moved to the left direction in FIG. 1, the actuator port 16 communicates with the pump through a pump port 3, and the actuator port 17 communicates with the tank through the tank port 4. As a result, the working oil discharged from the pump is supplied to the actuator through the actuator port 16, the working oil is discharged from the actuator to the tank through the actuator port 17, and the actuator is operated to the other direction.

A signal pressure passage 18 configured to lead the pilot pressure in the first pilot chamber 14 or the second pilot chamber 15 to another device other than the control valve 100 as a signal pressure is formed in the valve housing 1.

A communication groove 19 opened in the first pilot chamber 14 is annularly formed in an outer peripheral surface of the one end portion of the spool 12. The communication groove 19 allows the first pilot chamber 14 and the signal pressure passage 18 to communicate with each other when the spool 12 is at the neutral position.

When the pilot pressure is led to the first pilot chamber 14, and the spool 12 is moved to the right direction in FIG. 1, the communication groove 19 keeps the communication state with the signal pressure passage 18 and allows the first pilot chamber 14 and the signal pressure passage 18 to communicate with each other. On the other hand, when the pilot pressure is led to the second pilot chamber 15 and the spool 12 is moved to the left direction in FIG. 1, the communication groove 19 is separated from the signal pressure passage 18 and shuts off the communication between the first pilot chamber 14 and the signal pressure passage 18.

A communication hole 20 configured to allow the second pilot chamber 15 and the signal pressure passage 18 to communicate with each other is formed in the spool 12. A check valve 21 configured to allow only the flow from the second pilot chamber 15 to the signal pressure passage 18 is interposed in the communication hole 20.

A valve accommodating portion 40 opened in the one end surface (left end surface in FIG. 1) of the spool 12 is formed in the communication hole 20, and the check valve 21 is accommodated in this valve accommodating portion 40. The communication hole 20 has a first passage 20a extending along the axial direction from the other end surface (right end surface in FIG. 1) of the spool 12, a part of the valve accommodating portion 40, and a second passage 20b extending over the outer periphery of the spool 12 from the valve accommodating portion 40. The axial direction refers to a center axis direction of the spool 12, that is, a moving direction of the spool 12.

An opening of the valve accommodating portion 40 is closed by the rod 30 as a closing member facing inside of the first pilot chamber 14. The rod 30 is screwed and fastened to the opening of the valve accommodating portion 40.

Figure 2:
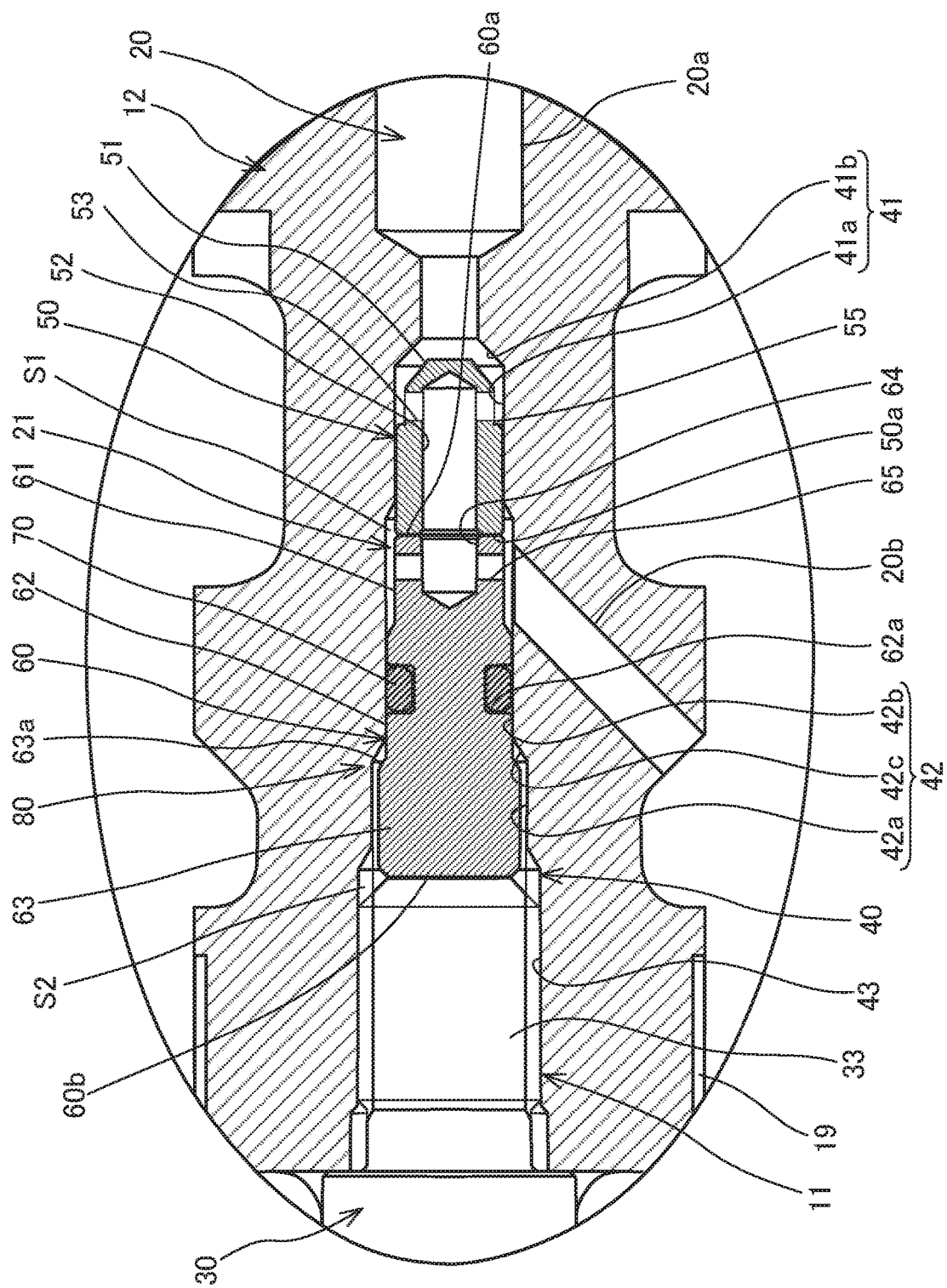
FIG. 2 is an enlarged sectional view illustrating one end portion of a spool in an enlarged manner.

FIG. 2 is an enlarged sectional view illustrating the one end portion of the spool 12 in an enlarged manner, and illustration of the valve housing 1 is omitted. As illustrated in FIG. 2, the check valve 21 has a poppet portion 50 configured to open/close the communication hole 20, a spacer portion 60 configured to regulate the moving amount of the poppet portion 50 in an open direction and an O-ring 70 as a seal member which seals a space between the spacer portion 60 and the valve accommodating portion 40.

The valve accommodating portion 40 has a first accommodating hole 41 in which the poppet portion 50 is accommodated, a second accommodating hole 42 in which the spacer portion 60 is accommodated, and a third accommodating hole 43 in which a base end portion 33 of the rod 30 is accommodated. The first accommodating hole 41, the second accommodating hole 42, and the third accommodating hole 43 have a circular opening section, respectively, and are formed coaxially, respectively.

A male screw to be screwed with a female screw formed on an inner periphery of the third accommodating hole 43 is formed on an outer periphery of the base end portion 33 of the rod 30. That is, the outer periphery of the base end portion 33 of the rod 30 and the inner periphery of the third accommodating hole 43 of the valve accommodating portion 40 constitute a screw fastening portion 11 of the rod 30 and the valve accommodating portion 40.

The second accommodating hole 42 has a large-diameter opening portion 42a, a small-diameter opening portion 42b, and a taper portion 42c configured to connect the large-diameter opening portion 42a and the small-diameter opening portion 42b. The large-diameter opening portion 42a, the small-diameter opening portion 42b, and the taper portion 42c have a circular section, respectively, and are formed coaxially, respectively. An inner diameter of the large-diameter opening portion 42a is larger than the inner diameter of the small-diameter opening portion 42b, and the taper portion 42c is inclined so that the inner diameter thereof becomes smaller from a connection portion with the large-diameter opening portion 42a toward a connection portion with the small-diameter opening portion 42b.

The taper portion 42c is a contact portion to which a projecting portion 63a of the spacer portion 60 can abut, which will be described later. Though details will be described later, when the projecting portion 63a of the spacer portion 60 abuts to the taper portion 42c, movement of the spacer portion 60 toward the poppet portion 50 side is regulated.

The first accommodating hole 41 has a sliding hole 41a through which the poppet portion 50 slides and a seat portion 41b on which the poppet portion 50 can be seated. The inner diameter of the sliding hole 41a is smaller than the inner diameter of the small-diameter opening portion 42b of the second accommodating hole 42.

Figure 3:
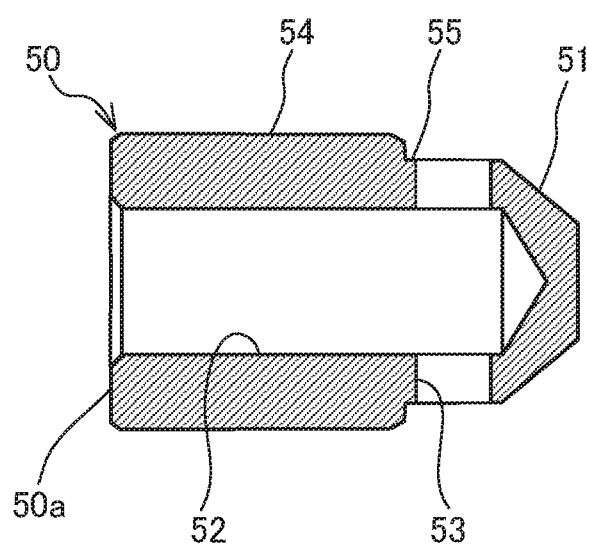
FIG. 3 is a sectional view of a poppet portion.

FIG. 3 is a sectional view of the poppet portion 50. As illustrated in FIG. 3, the poppet portion 50 has a seated portion 51 having a conical shape and seated on the seat portion 41b provided in the communication hole 20, a sliding portion 54 slidable along the sliding hole 41a, a cylinder portion 55 configured to connect the seated portion 51 and the sliding portion 54, a first internal passage 52 opened in a rear surface 50a which is an end surface on a side opposite to the seated portion 51, and a first through hole 53 opened in the outer peripheral surface of the cylinder portion 55 and communicating with the first internal passage 52. An outer diameter of the cylinder portion 55 is smaller than the outer diameter of the sliding portion 54. Thus, as illustrated in FIG. 2, a communication path for the working oil is formed between the outer peripheral surface of the cylinder portion 55 and the inner peripheral surface of the sliding hole 41a of the first accommodating hole 41.

Figure 4:
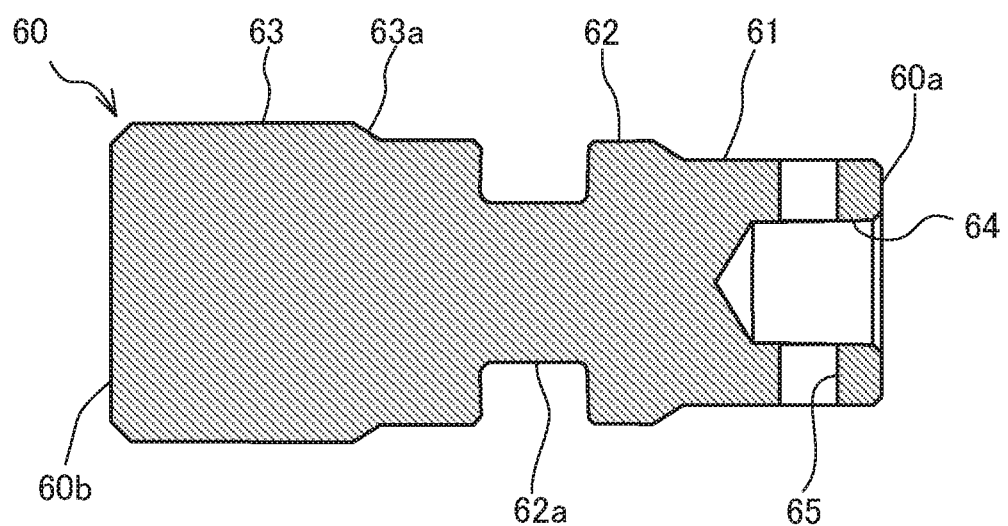
FIG. 4 is a sectional view of a spacer portion.

FIG. 4 is a sectional view of the spacer portion 60. As illustrated in FIG. 4, the spacer portion 60 has an abutting end portion 61 abutting to the poppet portion 50, a sliding portion 62 slidable along the small-diameter opening portion 42b, and a base end portion 63 abutting to the taper portion 42c. The abutting end portion 61, the sliding portion 62, and the base end portion 63 have a circular section, respectively, and are formed coaxially, respectively.

As illustrated in FIG. 2, in the spacer portion 60, when the poppet portion 50 is in the open valve state, a distal end surface 60a thereof abuts to the poppet portion 50, and a rear surface 60b on a side opposite to the distal end surface 60a abuts to the base end portion 33 of the rod 30.

Figure 5:
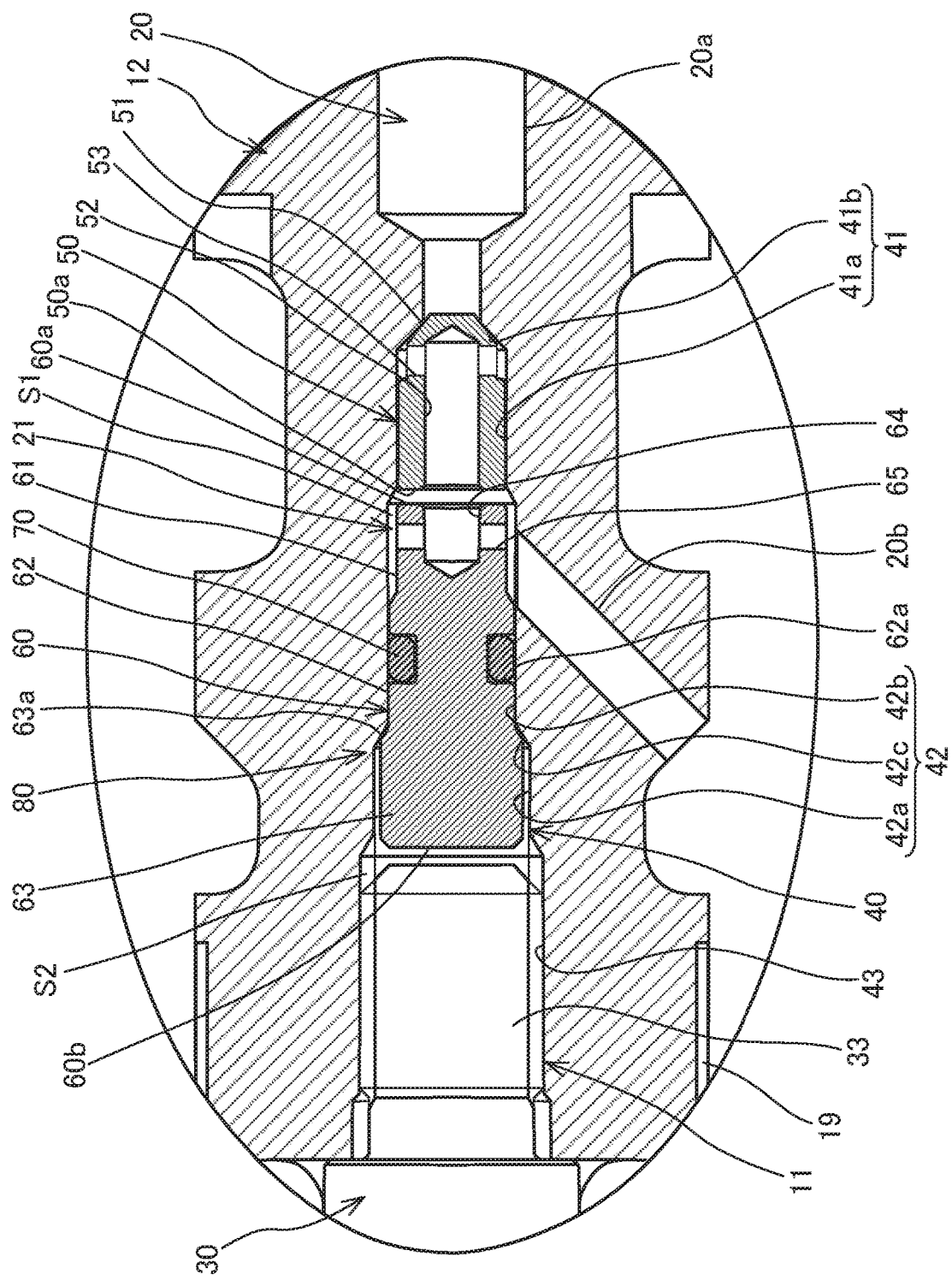
FIG. 5 is a view for explaining that movement of the spacer portion of the control valve according to the first embodiment of the present invention is regulated.

The spacer portion 60 is movable in the axial direction within a range from a position abutting to the base end portion 33 of the rod 30 (see FIG. 2) to a position abutting to the taper portion 42c (see FIG. 5). The rear surface 50a of the poppet portion 50 abuts to the distal end surface 60a of the spacer portion 60, and the rear surface 60b of the spacer portion 60 abuts to the base end portion 33 of the rod 30, whereby the moving amount of the poppet portion 50 to an open direction is limited. That is, the base end portion 33 of the rod 30 regulates movement of the spacer portion 60 by the pilot pressure from the second pilot chamber 15. Regardless of the position of the spacer portion 60, in a state where the rear surface 50a of the poppet portion 50 abuts to the distal end surface 60a of the spacer portion 60, an open amount of the poppet portion 50 is sufficiently ensured when the pilot pressure is led to the second pilot chamber 15. More specifically, in both the state where the spacer portion 60 abuts to the base end portion 33 of the rod 30 (see FIG. 2) and the state where the spacer portion 60 abuts to the taper portion 42c (see FIG. 5), the open amount of the poppet portion 50 is sufficiently ensured when the pilot pressure is led to the second pilot chamber 15.

The outer diameter of the base end portion 63 of the spacer portion 60 is larger than the outer diameter of the sliding portion 62. In other words, the projecting portion 63a protruding outward than the sliding portion 62 in a radial direction is formed on the base end portion 63 of the spacer portion 60. The projecting portion 63a is formed over the entire periphery of the base end portion 63.

A second internal passage 64 opened in the distal end surface 60a which is an end surface facing the poppet portion 50, and a second through hole 65 opened in the outer peripheral surface of the abutting end portion 61 and communicating with the second internal passage 64, are formed in the abutting end portion 61 of the spacer portion 60. The second internal passage 64 is opened by facing the opening of the first internal passage 52 of the poppet portion 50. The outer diameter of the abutting end portion 61 is smaller than the outer diameter of the sliding portion 62. Thus, as illustrated in FIG. 2, a communication path for the working oil is formed between the outer peripheral surface of the abutting end portion 61 and the inner peripheral surface of the small-diameter opening portion 42b of the second accommodating hole 42.

An annular groove 62a is formed in the sliding portion 62, and an O-ring 70 is attached to this groove 62a. The O-ring 70 provided in the spacer portion 60 is disposed so as to fill a gap between the small-diameter opening portion 42b of the second accommodating hole 42 and the spacer portion 60. Therefore, the valve accommodating portion 40 is divided by the O-ring 70 into a space S1 on the poppet portion 50 side, that is, on the distal end surface 60a side (right side in FIG. 2) of the spacer portion 60 and a space S2 on the base end portion 33 side of the rod 30, that is, on the rear surface 60b side (left side in FIG. 2) of the spacer portion 60. The space S1 constitutes a part of the aforementioned communication hole 20.

One end of the aforementioned second passage 20b is connected to the inner peripheral surface of the small-diameter opening portion 42b in the second accommodating hole 42 defining the space S1. That is, the second passage 20b formed in the spool 12 is a communication path which allows the second through hole 65 of the spacer portion 60 and the signal pressure passage 18 (see FIG. 1) of the valve housing 1 to communicate with each other.

Subsequently, an operation of the control valve 100 will be described.

As illustrated in FIG. 1, when the pilot pressure is led to the first pilot chamber 14, and the spool 12 is moved to the right direction in FIG. 1 by the action of the pilot pressure, the actuator port 17 communicates with the pump, and the actuator port 16 communicates with the tank. At this time, since the communication groove 19 keeps the communication state with the signal pressure passage 18, the pilot pressure of the first pilot chamber 14 is led to the signal pressure passage 18 through the communication groove 19.

Since the check valve 21 is interposed in the communication hole 20, the pilot pressure of the first pilot chamber 14 does not go out to the tank through the signal pressure passage 18, the communication hole 20, and the second pilot chamber 15. As the pilot pressure of the first pilot chamber 14 acts on the poppet portion 50 through the communication groove 19, the signal pressure passage 18, and the second passage 20b, and the seated portion 51 of the poppet portion 50 is seated on the seat portion 41b, the check valve 21 is brought to the closed valve state (see FIG. 5).

After the spool 12 has moved to the right direction in FIG. 1, when the first pilot chamber 14 communicates with the tank, the spool 12 is returned to the neutral position illustrated in FIG. 1. Since the first pilot chamber 14 communicates with the signal pressure passage 18 through the communication groove 19, the pressure of the signal pressure passage 18 goes out to the tank through the communication groove 19 and the first pilot chamber 14. Therefore, the pressure does not remain in the signal pressure passage 18, and another device connected to the signal pressure passage 18 does not erroneously operate.

When the pilot pressure is led to the second pilot chamber 15, and the spool 12 is moved to the left direction in FIG. 1 by the action of the pilot pressure, the actuator port 16 communicates with the pump, and the actuator port 17 communicates with the tank. At this time, the pilot pressure led to the second pilot chamber 15 acts on the check valve 21 through the first passage 20a of the communication hole 20, pushes open the poppet portion 50 of the check valve 21 and is led to the signal pressure passage 18.

More specifically, the pilot pressure of the second pilot chamber 15 is led to the signal pressure passage 18 through the first passage 20a of the spool 12, a space between the seated portion 51 of the check valve 21 and the seat portion 41b, a space between the sliding hole 41a and the outer periphery of the cylinder portion 55 of the poppet portion 50, the first through hole 53 of the poppet portion 50, the first internal passage 52 of the poppet portion 50, the second internal passage 64 of the spacer portion 60, the second through hole 65 of the spacer portion 60, a space between the outer periphery of the abutting end portion 61 of the spacer portion 60 and the small-diameter opening portion 42b, and the second passage 20b of the spool 12. As described above, in this embodiment, the pilot pressure of the second pilot chamber 15 can be led to the signal pressure passage 18 (see FIG. 1) through the first internal passage 52 of the poppet portion 50 and the second internal passage 64 of the spacer portion 60.

At this time, since the communication groove 19 illustrated in FIG. 1 is separated from the signal pressure passage 18, the pilot pressure of the second pilot chamber 15 does not go out to the tank from the first pilot chamber 14 through the signal pressure passage 18.

After the spool 12 has moved to the left direction in FIG. 1, when the second pilot chamber 15 communicates with the tank, the spool 12 is returned to the neutral position illustrated in FIG. 1. As a result, since the communication groove 19 communicates with the signal pressure passage 18, the pressure of the signal pressure passage 18 goes out to the tank through the communication groove 19 and the first pilot chamber 14. Therefore, the pressure does not remain in the signal pressure passage 18, and another device connected to the signal pressure passage 18 does not erroneously operate.

A structure configured to regulate the movement of the spacer portion 60 will be described in detail by referring to FIG. 5. FIG. 5 is a view for explaining that the movement of the spacer portion 60 is regulated, and similarly to FIG. 2, the one end portion of the spool 12 of the control valve 100 is illustrated in an enlarged manner. As described above, the projecting portion 63a protruding outward in the radial direction is formed on the base end portion 63 of the spacer portion 60, and the taper portion 42c as the abutting portion configured to abut to the projecting portion 63a is formed on the valve accommodating portion 40 of the spool 12. Thus, as the projecting portion 63a abuts to the taper portion 42c, the movement of the spacer portion 60 toward the poppet portion 50 is limited.

As illustrated in FIG. 5, in the closed valve state where the poppet portion 50 is seated on the seat portion 41b, a predetermined gap is formed between the distal end surface 60a of the spacer portion 60 and the rear surface 50a of the poppet portion 50 in the closed valve state. That is, the taper portion 42c is formed at the position separated from the seat portion 41b only by a predetermined distance so that, in the state where the projecting portion 63a of the spacer portion 60 abuts to the taper portion 42c, the gap is formed between the distal end surface 60a of the spacer portion 60 and the poppet portion 50 in the closed valve state. This gap is set to a sufficient length for the poppet portion 50 to perform an opening/closing operation.

As a result, the poppet portion 50 can perform the opening/closing operation even in the state where the projecting portion 63a of the spacer portion 60 abuts to the taper portion 42c. That is, even if the spacer portion 60 is held at the position which is the closest to the poppet portion 50 in the closed valve state, the poppet portion 50 is separated from the seat portion 41b, moved to the open direction until the poppet portion 50 abuts to the distal end surface 60a of the spacer portion 60, and is brought into the open valve state.

Figure 6A:
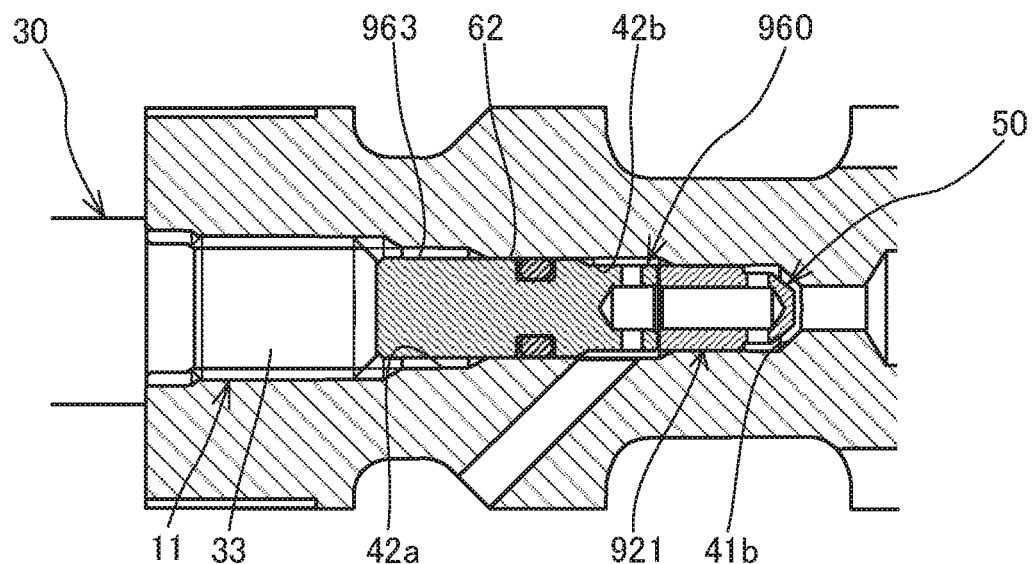
FIG. 6A is a view for explaining an operation of a check valve of the control valve according to a comparative example of the first embodiment of the present invention and illustrates a state where the check valve is open.
Figure 6B:
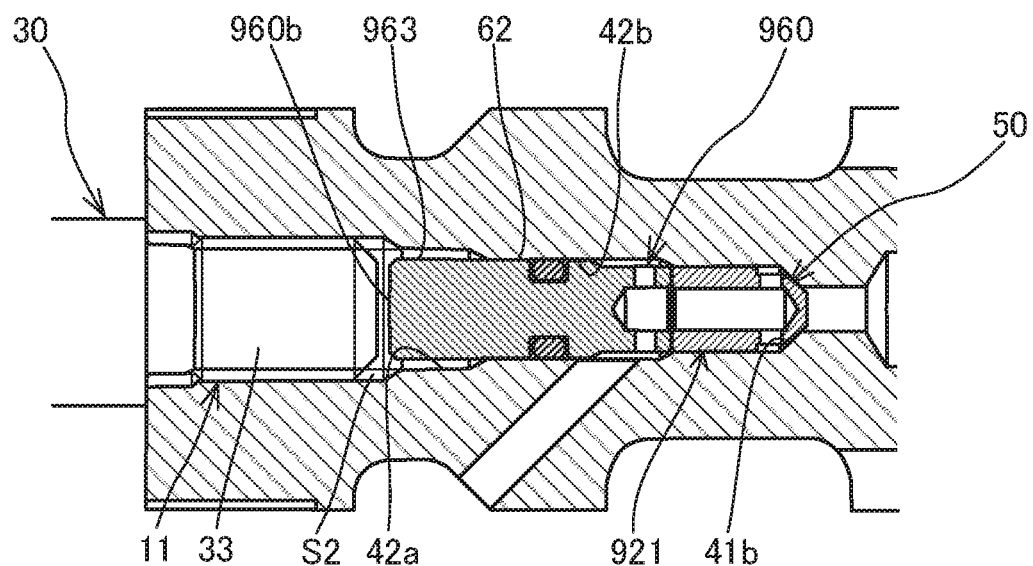
FIG. 6B is a view for explaining an operation of a check valve of the control valve according to a comparative example of the first embodiment of the present invention and illustrates a state where the check valve is closed.

The action and effect of this embodiment in which the movement of the spacer portion 60 in the axial direction is regulated will be described more specifically in comparison with a comparative example of this embodiment illustrated in FIGS. 6A and 6B. FIG. 6 are views for explaining the operation of a check valve 921 of the control valve according to the comparative example of this embodiment, in which FIG. 6A illustrates a state where the check valve 921 is open, and FIG. 6B illustrates a state where the check valve 921 is closed. As illustrated in FIG. 6A, in the comparative example of this embodiment, the projecting portion 63a (see FIGS. 2, 4, and 5) protruding outward in the radial direction is not provided on a base end portion 963 of a spacer portion 960. That is, the base end portion 963 and the sliding portion 62 have the same diameter.

As illustrated in FIG. 6A, when the pilot pressure is led to the second pilot chamber 15, the poppet portion 50 is separated from the seat portion 41b, and the check valve 921 is brought into the open valve state. Since the spacer portion 960 is accommodated slidably in the axial direction in the small-diameter opening portion 42b, the spacer portion 960 is moved together with the poppet portion 50 to the left direction in the figure and abuts to the base end portion 33 of the rod 30. As a result, the moving amount of the poppet portion 50 is regulated by the spacer portion 960.

As illustrated in FIG. 6B, when the pilot pressure is led to the first pilot chamber 14, the poppet portion 50 is seated on the seat portion 41b, and the check valve 921 is borough into the closed valve state. At this time, there is a concern that the working oil enters into the check valve 921 side from the first pilot chamber 14 through the screw fastening portion 11 which is a connection portion between the one end portion of the spool 12 and the rod 30. When the pilot pressure is led to the first pilot chamber 14, and the state where the second pilot chamber 15 communicates with the tank, that is, when the state where the pressure of the first pilot chamber 14 is higher than the pressure (tank pressure) of the second pilot chamber 15 is kept, the pressure is raised in the space S2 on the rear surface 960b side of the spacer portion 960.

As a result, the spacer portion 960 is moved in the axial direction toward the poppet portion 50 in the closed valve state and presses the poppet portion 50 so as to press the poppet portion 50 onto the seat portion 41b. After that, when the first pilot chamber 14 communicates with the tank, the pressure in the space S2 on the rear surface 960b side of the spacer portion 960 goes out to the tank through the screw fastening portion 11 of the one end portion of the spool 12 and the rod 30. However, it takes time for the pressure in the space S2 on the rear surface 960b side of the spacer portion 960 to lower to the tank pressure. Therefore, if the pilot pressure is led to the second pilot chamber 15 in the state (state where the pressure remains) where the pressure in the space S2 has not lowered to the tank pressure, the valve opening operation of the poppet portion 50 according to the pressure of the second pilot chamber 15 is inhibited by the spacer portion 960, and responsiveness of the check valve 921 is deteriorated.

On the other hand, in this embodiment, when the pilot pressure is led to the first pilot chamber 14, and the pilot pressure of the first pilot chamber 14 acts on the rear surface 60b of the spacer portion 60 as illustrated in FIG. 5, the taper portion 42c as the abutting portion formed on the spool 12 abuts to the projecting portion 63a of the spacer portion 60. As a result, movement of the spacer portion 60 in the axial direction toward the poppet portion 50 in the closed valve state is regulated. As described above, in this embodiment, the projecting portion 63a of the spacer portion 60 and the taper portion 42c of the spool 12 function as a movement regulating portion 80 configured to regulate movement of the spacer portion 60 toward the poppet portion 50.

As a result, even in the state where the spacer portion 60 has moved to the maximum to the poppet portion 50 side, the gap is formed between the distal end surface 60a of the spacer portion 60 and the rear surface 50a of the poppet portion 50 in the closed valve state. As a result, when the pilot pressure is led to the second pilot chamber 15, inhibition on the valve opening operation of the poppet portion 50 by the spacer portion 60 is prevented and thus, the pilot pressure of the second pilot chamber 15 is immediately led to the other device other than the control valve 100 through the signal pressure passage 18. As described above, according to this embodiment, the responsiveness of the check valve 21 can be improved as compared with the check valve 921 in the comparative example.

According to the aforementioned embodiment, the subsequent actions and effects are exerted.

(1) The movement regulating portion 80 configured to regulate movement of the spacer portion 60 toward the poppet portion 50 is constituted by the projecting portion 63a formed on the spacer portion 60 and protruding outward in the radial direction of the spacer portion 60 and the taper portion 42c as the abutting portion formed on the spool 12 and abutting to the projecting portion 63a. As a result, even if the pilot pressure of the first pilot chamber 14 is led to the space S2 through the screw fastening portion 11, and acts on the rear surface 60b of the spacer portion 60 when the pilot pressure is led to the first pilot chamber 14, the movement of the spacer portion 60 toward the poppet portion 50 is regulated. As a result, since the gap is formed between the distal end surface 60a of the spacer portion 60 and the rear surface 50a of the poppet portion 50 in the closed valve state, when the pilot pressure is led to the second pilot chamber 15, the inhibition on the valve opening operation of the poppet portion 50 by the spacer portion 60 is prevented. That is, according to this embodiment, the responsiveness of the check valve 21 can be improved.

(2) If entering of the working oil into the space S2 from the first pilot chamber 14 is to be prevented by providing a seal member at a portion where the rod 30 and the one end surface of the spool 12 abut to each other, there is a concern that an increase in manufacturing costs is incurred with an increase in the number of components and size. To the contrary, in this embodiment, the movement of the spacer portion 60 toward the poppet portion 50 can be regulated only by providing the projecting portion 63a on the spacer portion 60 and by providing the taper portion 42c as the abutting portion on the spool 12, and the responsiveness of the check valve 21 can be improved while the increase in the manufacturing cost can be suppressed.

Variation 1 of the First Embodiment

The aforementioned embodiment describes the example in which the projecting portion 63a abutting to the taper portion 42c is provided over the entire periphery of the base end portion 63 of the spacer portion 60, but the present invention is not limited to that. Instead of the projecting portion 63a, a plurality of or a single rod-shaped projecting portion protruding outward in the radial direction may be provided on the base end portion 63 of the spacer portion 60, for example, so that the movement of the spacer portion 60 may be regulated by causing this projecting portion to abut to the taper portion 42c.

Variation 2 of the First Embodiment

The aforementioned embodiment describes the example in which the taper portion 42c is provided as the abutting portion to which the projecting portion 63a abuts, but the present invention is not limited to that. Instead of the taper portion 42c, a planar stepped portion orthogonal to the center axis of the spool 12 is provided, for example, so that the movement of the spacer portion 60 may be regulated by causing this stepped portion to abut to the projecting portion 63a.

Variation 3 of the First Embodiment

The aforementioned embodiment describes the example in which the taper portion 42c as the abutting portion which abuts to the projecting portion 63a of the spacer portion 60 is formed on the spool 12, but the present invention is not limited to that. A member having an abutting portion which abuts to the projecting portion 63a of the spacer portion 60 may be attached to the valve accommodating portion configured to accommodate the check valve 21, for example.

Variation 4 of the First Embodiment

The aforementioned embodiment describes the example in which movement of the spacer portion 60 is regulated when the pressure in the space S2 is raised by entering of the working oil into the space S2 on the rear surface 60b side of the spacer portion 60 from the first pilot chamber 14 through the screw fastening portion 11, but the present invention is not limited to that. The present invention can be applied to various control valves in a form in which the pressure in the space S2 on the rear surface 60b side of the spacer portion 60 is raised when the pilot pressure is led to the first pilot chamber 14.

Second Embodiment

The control valve 100 according to a second embodiment of the present invention will be described by referring to FIG. 7. Differences from the aforementioned first embodiment will be mainly described below, and the same reference numerals are given to the same configurations as or the configuration corresponding to the configuration described in the first embodiment in the figures, and the description will be omitted.

The first embodiment describes the example in which the movement regulating portion 80 is configured to regulate the movement of the spacer portion 60 by the projecting portion 63a protruding outward in the radial direction of the spacer portion 60 and the taper portion 42c formed on the spool 12, but the present invention is not limited to that. As the movement regulating portion, various configurations can be employed which can regulate movement of the spacer portion 60 toward the poppet portion 50.

Figure 7:
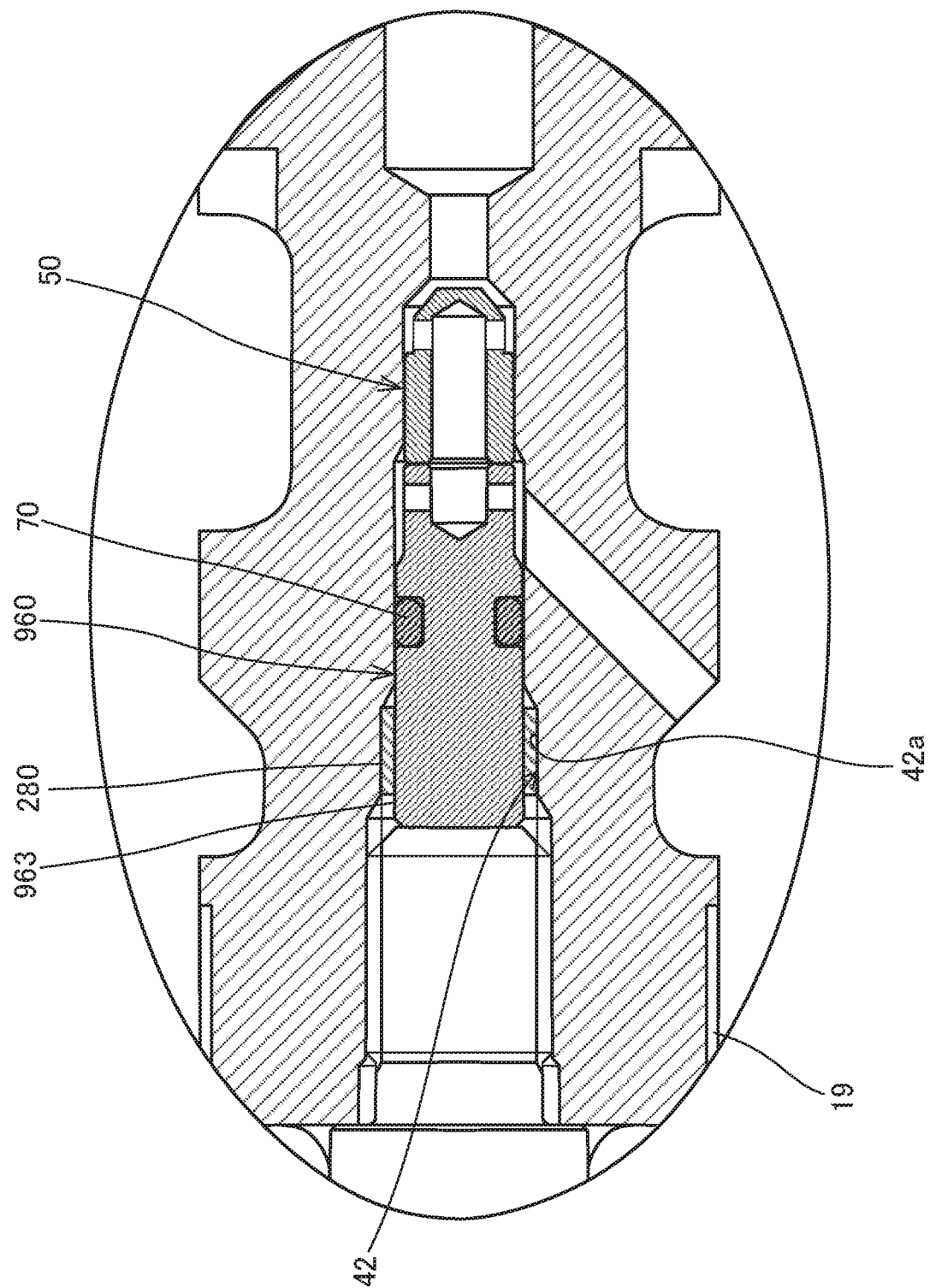
FIG. 7 is an enlarged sectional view illustrating a movement regulating portion of the control valve according to the variation of the first embodiment of the present invention.

In this second embodiment, as illustrated in FIG. 7, a cylindrical elastic member 280 as the movement regulating portion is provided between the base end portion 963 of the spacer portion 960 and the large-diameter opening portion 42a of the second accommodating hole 42 in the control valve having the configuration similar to the comparative example (see FIG. 5) of this embodiment.

The elastic member 280 is interposed between the base end portion 963 and the large-diameter opening portion 42a in a state compressed in the radial direction. The elastic member 280 can generate large sliding resistance as compared with the O-ring 70, whereby the movement of the spacer portion 960 in the axial direction is regulated. A fitting recess portion fitted with the elastic member 280 may be further formed on the base end portion 963 of the spacer portion 960.

Third Embodiment

Figure 8:
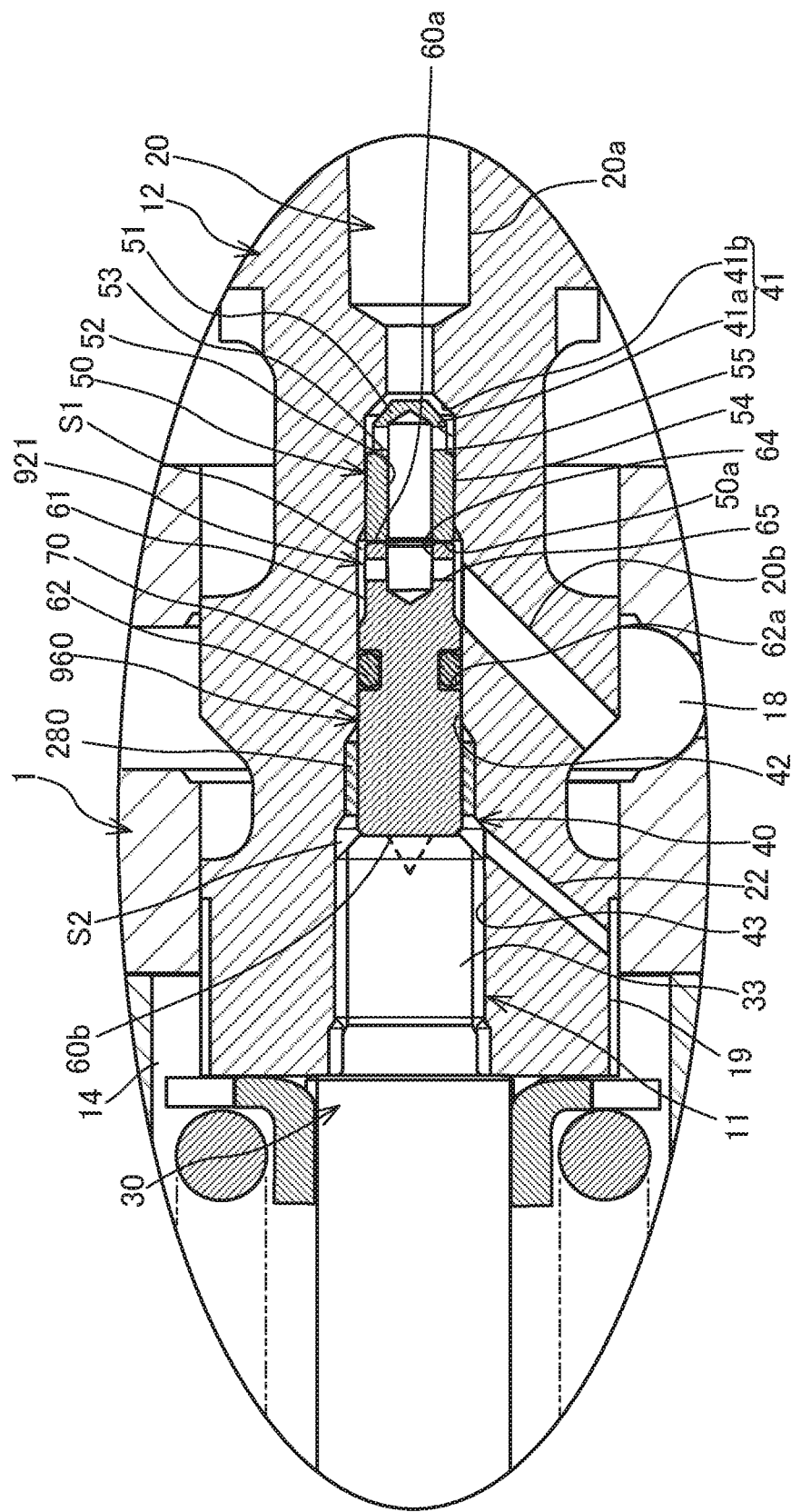
FIG. 8 is an enlarged sectional view illustrating one end portion of the spool of the control valve according to a second embodiment of the present invention in an enlarged manner and illustrates a state where the check valve is open.
Figure 9:
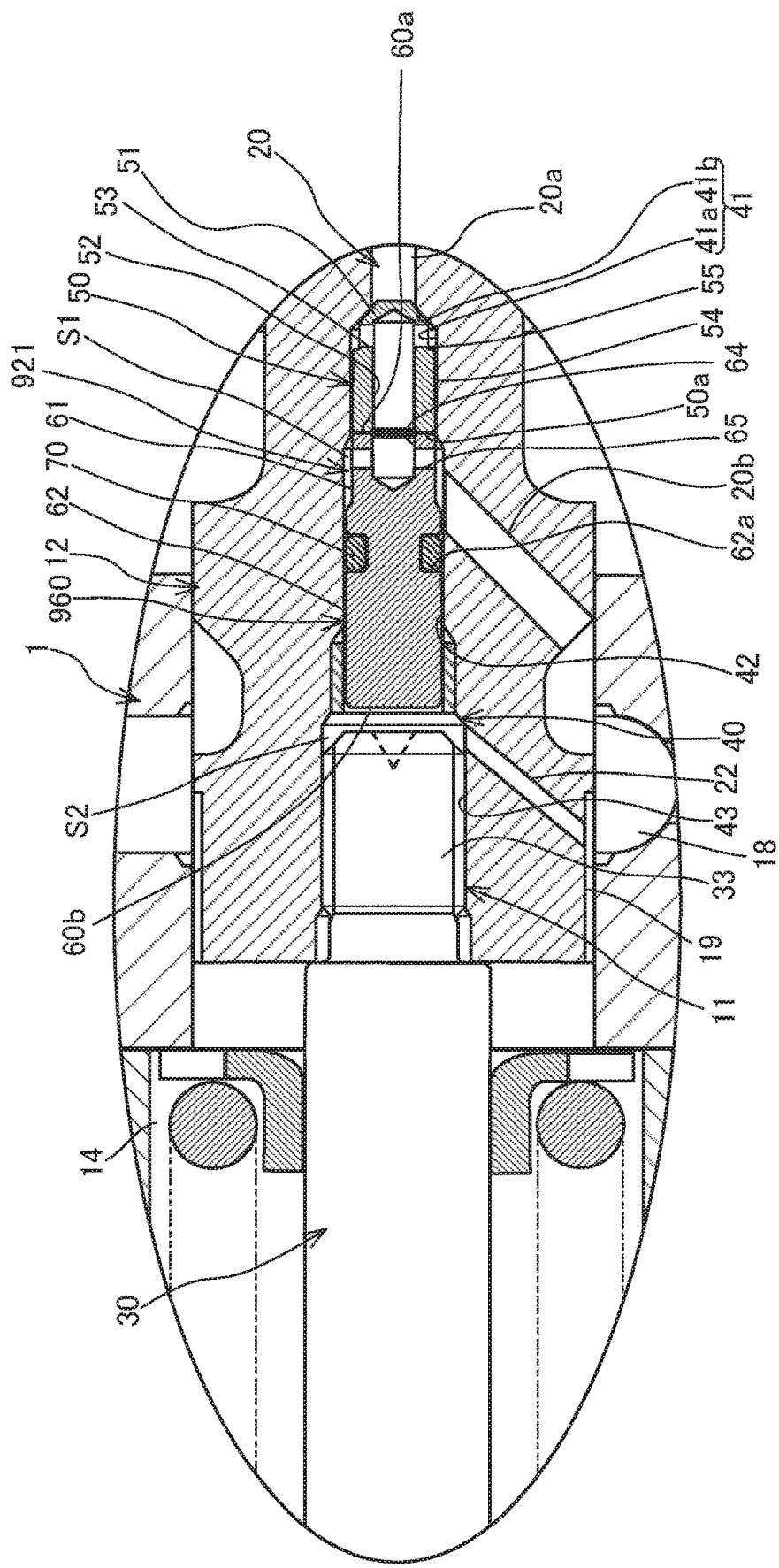
FIG. 9 is an enlarged sectional view illustrating the one end portion of the spool of the control valve according to a second embodiment of the present invention in an enlarged manner and illustrates a state where the check valve is closed.

The control valve 100 according to a third embodiment of the present invention will be described by referring to FIGS. 8 and 9. Differences from the aforementioned second embodiment will be mainly described below, and the same reference numerals are given to the same configurations as or the configuration corresponding to the configuration described in the second embodiment in the figures, and the description will be omitted.

In this third embodiment, a drain passage 22 is provided in order to prevent the pressure remaining in the space S2 on the rear surface 60b side of the spacer portion 960, that is, on the rear surface side of the check valve 921. The drain passage 22 is formed in the spool 12 and allows the communication groove 19 and the space S2 on the rear surface 60b side of the spacer portion 960 divided by the O-ring 70 to communicate with each other. One end of the drain passage 22 is opened in the inner peripheral surface of the third accommodating hole 43 and the other end of the drain passage 22 is opened in a bottom surface of the communication groove 19.

Here, the force which regulates the movement of the spacer portion 960 might become smaller when the aforementioned elastic member 280 is deteriorated by use of the control valve 100 for a long time in some cases. In this case, when the pilot pressure is led to the first pilot chamber 14, and the pressure in the space S2 on the rear surface 60b side of the spacer portion 960 is raised, the spacer portion 960 moves in the axial direction toward the poppet portion 50 in the closed valve state and presses the poppet portion 50 so as to press the poppet portion 50 onto the seat portion 41b as illustrated in FIG. 9. Here, if the drain passage 22 is not provided, when the first pilot chamber 14 communicates with the tank after that, the pressure in the space S2 on the rear surface 60b side of the spacer portion 960 goes out to the tank through the screw fastening portion 11 of the one end portion of the spool 12 and the rod 30. However, it takes time for the pressure in the space S2 on the rear surface 60b side of the spacer portion 960 to lower to the tank pressure. Thus, if the drain passage 22 is not provided, in the state (state where the pressure remains) where the pressure in the space S2 has not lowered to the tank pressure, when the pilot pressure is led to the second pilot chamber 15, the valve opening operation of the poppet portion 50 according to the pressure of the second pilot chamber 15 is inhibited by the spacer portion 960, and there is a concern that responsiveness of the check valve 921 is deteriorated.

On the other hand, in this third embodiment, since the drain passage 22 is formed, when the first pilot chamber 14 communicates with the tank from the state where the pilot pressure has been led to the first pilot chamber 14, the space S2 on the rear surface 60b side of the spacer portion 960 communicates with the tank through the drain passage 22, the communication groove 19, and the first pilot chamber 14. Passage resistance when the working oil passes through the drain passage 22 is smaller than the passage resistance when the working oil passes through the screw fastening portion 11. Thus, when the first pilot chamber 14 communicates with the tank, the pressure quickly goes out to the tank from the space S2 through the drain passage 22.

As described above, in this third embodiment, when the pilot pressure is led to the second pilot chamber 15, and the first pilot chamber 14 communicates with the tank, the space S2 on the rear surface side of the check valve 921 divided by the O-ring 70 communicates with the tank through the drain passage 22, the communication groove 19, and the first pilot chamber 14. Thus, when the pilot pressure is led to the second pilot chamber 15, the pressure in the space S2 on the rear surface side of the check valve 921 divided by the O-ring 70 can be immediately lowered to the tank pressure. As a result, when the pilot pressure is led to the second pilot chamber 15, the spacer portion 960 is moved to the left direction in the figure together with the poppet portion 50, and the pilot pressure of the second pilot chamber 15 is immediately led to the other device through the signal pressure passage 18. According to this third embodiment, even if the force of the elastic member 280 for regulating the movement of the spacer portion 960 becomes smaller, the responsiveness of the check valve 921 can be made favorable.

Variation 1 of the Third Embodiment

The number of the drain passages 22 may be one or may also be plural.

Variation 2 of the Third Embodiment

The aforementioned third embodiment describes the example in which the drain passage 22 allows the third accommodating hole 43 and the communication groove 19 to communicate with each other, but the present invention is not limited to that. The drain passage 22 only needs to be configured to allow the space S2 on the rear surface 60b side of the spacer portion 960 and the communication groove 19 to communicate with each other. For example, the one end of the drain passage 22 may be opened in the inner peripheral surface of the second accommodating hole 42.

Variation 3 of the Third Embodiment

The aforementioned third embodiment describes the example in which the cylindrical elastic member 280 is provided, but if the drain passage 22 is formed in the spool 12, the elastic member 280 can be omitted. In this case, the poppet portion 50 and the spacer portion 960 constituting the check valve 921 do not have to be separate bodies. That is, the poppet portion 50 and the spacer portion 960 may be formed as an inseparable single component by bonding or integral molding. When the poppet portion 50 and the spacer portion 960 are integrally molded, the first internal passage 52 and the second internal passage 64 are formed from the rear surface side of the spacer portion 960, and the opening portion thereof is closed by a plug or the like.

According to such configuration, when the pilot pressure is led to the first pilot chamber 14, the pilot pressure of the first pilot chamber 14 is led to the space S2 through the screw fastening portion 11, and even if the pressure in the space S2 rises higher than the tank pressure, when the pilot pressure is led to the second pilot chamber 15, the pressure in the space S2 quickly goes out to the tank. Therefore, when the pilot pressure is led to the second pilot chamber 15, the pressure in the space S2 on the rear surface side of the check valve 921 can be immediately lowered to the tank pressure. That is, according to this variation, occurrence of delay in the valve opening operation of the check valve 921 caused by the pressure remaining in the space S2 can be prevented, and the responsiveness of the check valve 921 can be improved.

Variation 4 of the Third Embodiment

The aforementioned third embodiment describes the example in which the pressure in the space S2 having been raised by the working oil entering into the space S2 on the rear surface 60b side of the spacer portion 960 from the first pilot chamber 14 through the screw fastening portion 11 is immediately made to escape to the tank when the first pilot chamber 14 communicates with the tank, but the present invention is not limited to that. The present invention can be applied to various control valves in a form in which the pressure in the space S2 on the rear surface 60b side of the spacer portion 960 is raised when the pilot pressure is led to the first pilot chamber 14.

The configuration, actions, and effects of the embodiments of the present invention configured as above will be described collectively. The configuration in the parentheses is exemplification.

The control valve 100 includes the spool 12 slidably incorporated in the valve housing 1, the first pilot chamber 14 and the second pilot chamber 15 disposed by facing the both ends of the spool 12, the signal pressure passage 18 formed in the valve housing 1 and configured to lead the pilot pressure of the first pilot chamber 14 or the second pilot chamber 15 to the other device as a signal pressure, the communication groove 19 formed in the spool 12 and configured to allow the first pilot chamber 14 and the signal pressure passage 18 to communicate with each other when the spool 12 is at the neutral position, the communication hole 20 formed in the spool 12 and configured to allow the second pilot chamber 15 and the signal pressure passage 18 to communicate with each other, and the check valve 21, 921 interposed in the communication hole 20 and configured to allow only the flow from the second pilot chamber 15 to the signal pressure passage 18, in which the communication groove 19 allows the first pilot chamber 14 and the signal pressure passage 18 to communicate with each other when the pilot pressure is led to the first pilot chamber 14, and the spool 12 is moved, while the communication between the first pilot chamber 14 and the signal pressure passage 18 is shut off when the pilot pressure is led to the second pilot chamber 15, and the spool 12 is moved, the check valve 21, 921 has the poppet portion 50 configured to open or close the communication hole 20 and the spacer portion 60, 960 configured to regulate the movement amount of the poppet portion 50 to the open direction, and the control valve 100 further includes the movement regulating portion (80,280) configured to regulate movement of the spacer portion 60, 960 toward the poppet portion 50.

In this configuration, when the pilot pressure is led to the first pilot chamber 14, even if the pilot pressure of the first pilot chamber 14 acts on the spacer portion 60, 960, the movement of the spacer portion 60, 960 toward the poppet portion 50 is regulated. As a result, since the gap is formed between the end surface of the spacer portion 60, 960 and the poppet portion 50 in the closed valve state, when the pilot pressure is led to the second pilot chamber 15, inhibition on the valve opening operation of the poppet portion 50 by the spacer portion 60, 960 is prevented. As a result, the responsiveness of the check valve 21, 921 can be improved.

In the control valve 100, the check valve 21, 921 is accommodated in the valve accommodating portion 40 opened in the one end surface of the spool 12, the opening of the valve accommodating portion 40 is closed by the closing member (rod 30) facing the inside of the first pilot chamber 14, and the closing member (rod 30) is screwed/fastened to the opening of the valve accommodating portion 40.

In this configuration, the movement of the spacer portion 60, 960 by the pilot pressure from the second pilot chamber 15 can be regulated by the closing member (rod 30).

In the control valve 100, the movement regulating portion 80 has the projecting portion 63a protruding outward in the radial direction of the spacer portion 60 and the abutting portion (taper portion 42c) provided in the spool 12 and configured to regulate the movement of the spacer portion 60 toward the poppet portion 50 by abutting to the projecting portion 63a.

In this configuration, the movement of the spacer portion 60 can be regulated only by providing the projecting portion 63a on the spacer portion 60 and providing the abutting portion (taper portion 42c) in the spool 12, and thus, an increase in the manufacturing cost can be suppressed.

In the control valve 100, the poppet portion 50 has the seated portion 51 capable of being seated on the seat portion 41b provided in the communication hole 20, the first internal passage 52 opened in the end surface on the side opposite to the seated portion 51, and the first through hole 53 opened in the outer peripheral surface and communicating with the first internal passage 52, the spacer portion 60, 960 has the second internal passage 64 opened in the end surface faced with the poppet portion 50 and the second through hole 65 opened in the outer peripheral surface and communicating with the second internal passage 64, and the communication hole 20 has the communication path (second passage 20b) configured to allow the second through hole 65 of the spacer portion 60, 960 and the signal pressure passage 18 of the valve housing 1 to communicate with each other.

In this configuration, the pilot pressure of the second pilot chamber 15 can be led to the signal pressure passage 18 through the first internal passage 52 of the poppet portion 50 and the second internal passage 64 of the spacer portion 60, 960.

The control valve 100 includes the spool 12 slidably incorporated in the valve housing 1, the first pilot chamber 14 and the second pilot chamber 15 disposed by facing the both ends of the spool 12, the signal pressure passage 18 formed in the valve housing 1 and configured to lead the pilot pressure of the first pilot chamber 14 or the second pilot chamber 15 to the other device as a signal pressure, the communication groove 19 formed in the spool 12 and configured to allow the first pilot chamber 14 and the signal pressure passage 18 to communicate with each other when the spool 12 is at the neutral position, the communication hole 20 formed in the spool 12 and configured to allow the second pilot chamber 15 and the signal pressure passage 18 to communicate with each other, the check valve 21, 921 interposed in the communication hole 20 and configured to allow only the flow from the second pilot chamber 15 to the signal pressure passage 18, and the valve accommodating portion 40 formed in the spool 12 and configured to accommodate the check valve 21, 921, wherein the communication groove 19 allows the first pilot chamber 14 and the signal pressure passage 18 when the pilot pressure is led to the first pilot chamber 14 and the spool 12 is moved, while the communication between the first pilot chamber 14 and the signal pressure passage 18 is shut off when the pilot pressure is led to the second pilot chamber 15 and the spool 12 is moved, the valve accommodating portion 40 is divided by the seal member (O-ring 70) into the communication hole 20 and the space S2 on the rear surface side of the check valve 21, 921, and the drain passage 22 configured to allow the space S2 and the communication groove 19 to communicate with each other is formed in the spool 12.

In this configuration, when the pilot pressure is led to the second pilot chamber 15, and the first pilot chamber 14 communicates with the tank, the space S2 on the rear surface side of the check valve 21, 921 divided by the seal member (O-ring 70) communicates with the tank through the drain passage 22, the communication groove 19, and the first pilot chamber 14. As a result, when the pilot pressure is led to the second pilot chamber 15, the pressure in the space S2 on the rear surface side of the check valve 21, 921 divided by the seal member (O-ring 70) can be immediately lowered to the tank pressure. Since occurrence of delay in the valve opening operation of the check valve 21, 921 caused by the pressure remaining in the space S2 can be prevented, and the responsiveness of the check valve 21, 921 can be improved.

In the control valve 100, the valve accommodating portion 40 is opened in the one end surface of the spool 12, the opening of the valve accommodating portion 40 is closed by the closing member (rod 30) facing the inside of the first pilot chamber 14, and the closing member (rod 30) is screwed and fastened to the opening of the valve accommodating portion 40.

In this configuration, the moving amount of the check valve 21 can be regulated by the closing member (rod 30).

In the control valve 100, the check valve 21, 921 has the poppet portion 50 configured to open or close the communication hole 20 and the spacer portion 60, 960 on which the O-ring 70 is provided, the poppet portion 50 has the seated portion 51 capable of being seated on the seat portion 41b provided in the communication hole 20, the first internal passage 52 opened on the side opposite to the seated portion 51, and the first through hole 53 opened in the outer peripheral surface and communicating with the first internal passage 52, the spacer portion 60, 960 has the second internal passage 64 opened by facing the first internal passage 52 and the second through hole 65 opened in the outer peripheral surface and communicating with the second internal passage 64, and the communication hole 20 has the communication path (second passage 20b) allowing the second through hole 65 of the spacer portion 60, 960 and the signal pressure passage 18 of the valve housing 1 to communicate with each other.

In this configuration, the pilot pressure of the second pilot chamber 15 can be led to the signal pressure passage 18 through the first internal passage 52 of the poppet portion 50 and the second internal passage 64 of the spacer portion 60, 960.

The embodiments of the present invention described above are merely illustration of some application examples of the present invention and the technical scope of the present invention is not limited to the specific constructions of the above embodiments.

The configurations described in the aforementioned embodiments and variations can be combined as appropriate.

This application is based on and claims priority to Japanese Patent Application No. 2018-043142 filed in Japan Patent Office on Mar. 9, 2018 and Japanese Patent Application No. 2018-043143 filed in Japan Patent Office on Mar. 9, 2018, the entire content of which is incorporated herein by reference.

The invention claimed is:

1. A control valve, comprising:
   a spool slidably incorporated in a valve housing;
   a first pilot chamber and a second pilot chamber, the first pilot chamber being disposed at one end of the spool, the second pilot chamber being disposed at the other end of the spool;
   a signal pressure passage formed in the valve housing and configured to lead a pilot pressure of the first pilot chamber or the second pilot chamber to another device other than the control valve as a signal pressure;
   a communication groove formed in the spool and configured to allow the first pilot chamber and the signal pressure passage to communicate with each other when the spool is at a neutral position;

a communication hole formed in the spool and configured to allow the second pilot chamber and the signal pressure passage to communicate with each other; and a check valve interposed in the communication hole and configured to allow only the flow from the second pilot chamber to the signal pressure passage, wherein the communication groove allows the first pilot chamber and the signal pressure passage to communicate with each other when the pilot pressure is led to the first pilot chamber and the spool is moved, while the communication between the first pilot chamber and the signal pressure passage is shut off when the pilot pressure is led to the second pilot chamber and the spool is moved;

the check valve comprises:
- a poppet portion configured to open or close the communication hole; and
- a spacer portion configured to regulate a movement amount of the poppet portion to an open direction; and the control valve further comprises a movement regulating portion configured to regulate movement of the spacer portion toward the poppet portion.

2. The control valve according to claim 1, wherein the check valve is accommodated in a valve accommodating portion opened in one end surface of the spool;

an opening of the valve accommodating portion is closed by a closing member facing an inside of the first pilot chamber; and the closing member is screwed and fastened to the opening of the valve accommodating portion.

3. The control valve according to claim 1, wherein the movement regulating portion comprises:

a projecting portion protruding outward in a radial direction of the spacer portion; and an abutting portion provided on the spool and configured to regulate movement of the spacer portion toward the poppet portion by abutting to the projecting portion.

4. The control valve according to claim 1, wherein the poppet portion comprises:

a seated portion capable of being seated on a seat portion provided in the communication hole;

a first internal passage opened in an end surface on the side opposite to the seated portion; and a first through hole opened in an outer peripheral surface and communicating with the first internal passage;

the spacer portion comprises:

a second internal passage opened in an end surface facing the poppet portion; and a second through hole opened in the outer peripheral surface and communicating with the second internal passage; and the communication hole has a communication path configured to allow the second through hole of the spacer portion and the signal pressure passage of the valve housing to communicate with each other.

5. A control valve, comprising:

a spool slidably incorporated in a valve housing;

a first pilot chamber and a second pilot chamber, the first pilot chamber being disposed at one end by facing both ends of the spool, the second pilot chamber being disposed at other end of the spool;

a signal pressure passage formed in the valve housing and configured to lead a pilot pressure of the first pilot chamber or the second pilot chamber to another device other than the control valve as a signal pressure;

a communication groove formed in the spool and configured to allow the first pilot chamber and the signal pressure passage to communicate with each other when the spool is at a neutral position;

a communication hole formed in the spool and configured to allow the second pilot chamber and the signal pressure passage to communicate with each other; and a check valve interposed in the communication hole and configured to allow only the flow from the second pilot chamber to the signal pressure passage, wherein the communication groove allows the first pilot chamber and the signal pressure passage to communicate with each other when the pilot pressure is led to the first pilot chamber and the spool is moved, while the communication between the first pilot chamber and the signal pressure passage is shut off when the pilot pressure is led to the second pilot chamber and the spool is moved;

the check valve comprises:
- a poppet portion configured to open or close the communication hole; and
- a spacer portion configured to regulate a movement amount of the poppet portion to an open direction;

the spacer portion is provided with a projecting portion protruding outward in a radial direction of the spacer portion; and the spool is provided with an abutting portion configured to regulate movement of the spacer portion toward the poppet portion by abutting to the projecting portion.

* * * * *